Nov. 29, 1932.  A. BARR  1,889,042
APPARATUS FOR PLOTTING MAPS FROM AIR PHOTOGRAPHS
Filed July 20, 1929
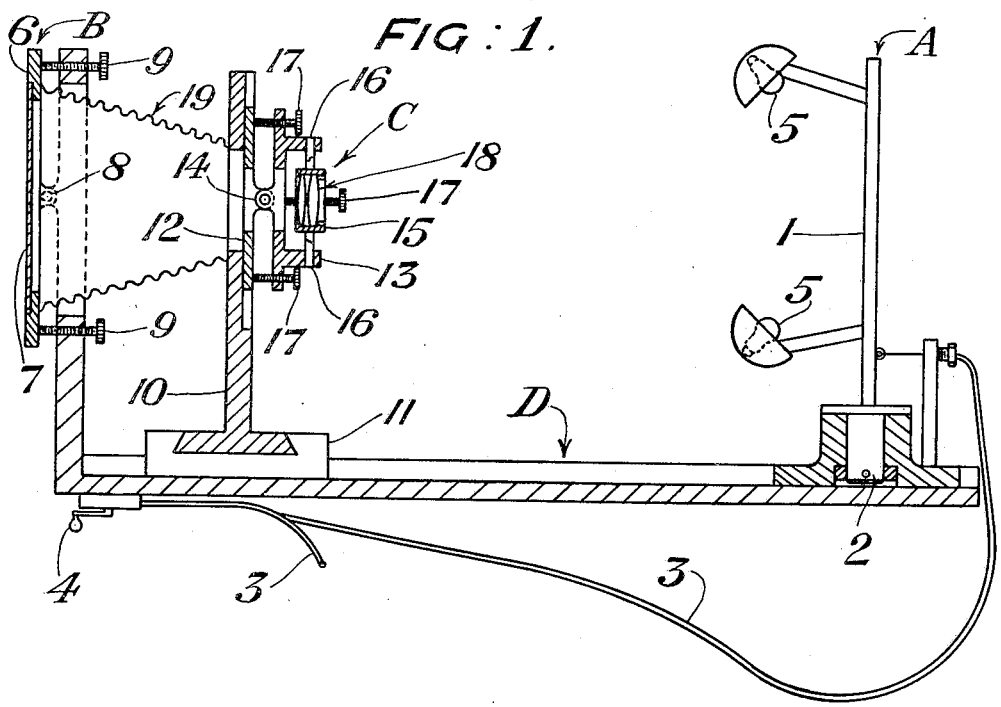
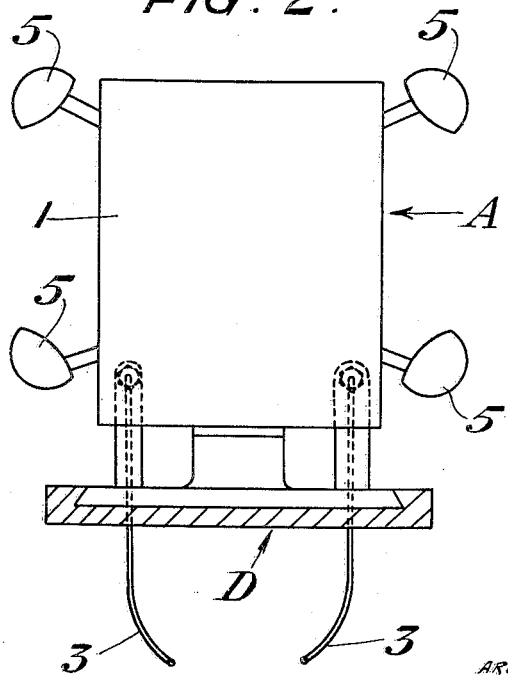
INVENTOR
ARCHIBALD BARR.
By Neill & Bunn
ATTORNEYS.

Patented Nov. 29, 1932

1,889,042

UNITED STATES PATENT OFFICE

ARCHIBALD BARR, OF ANNIESLAND, GLASGOW, SCOTLAND, ASSIGNOR TO BARR AND STROUD, LIMITED, OF GLASGOW, SCOTLAND

APPARATUS FOR PLOTTING MAPS FROM AIR PHOTOGRAPHS

Application filed July 20, 1929, Serial No. 379,798, and in Great Britain August 1, 1928.

This invention relates to apparatus of the epidiascope kind, for plotting, on a map surface, details of the area represented on an air photograph when the map positions of three or more control points which can be identified on the photograph, are known.

Apparatus according to this invention comprises a photograph-holder, a transparent map-holder and a lens-system, the lens-system being situated between the photograph-holder and the map-holder, the distances apart of the photograph-holder, the lens-system and the map-holder being adjustable, and the attitude angularly of the photograph-holder and the map-holder being alterable. Further, the attitude angularly of the lens-system is alterable. Thus, with a photograph, which may be a paper print on the photograph-holder, and suitably illuminated, and with a sheet of translucent material, say tracing paper on the front (the face away from the lens-system) of the transparent map-holder, which may be of glass, and with the parts set so that their distances apart and their attitudes angularly are correct, a rectified positive image of the photograph on the required scale will be formed on the back of the tracing paper and can be seen from the front, and the details thereof can be traced on the front of the paper.

Adjustment of the distances apart of the photograph-holder, the lens-system and the map-holder is for securing focus of the images of the photograph on the map surface and different magnifications of the photograph. Alteration of the attitude angularly of either the photograph-holder or the map-holder, or both, from their normal attitude of parallelism, is to suit cases in which the axis of the camera had a tilt from the vertical when the photograph was taken, or in which the control points are not on one horizontal plane. Alteration of the attitude angularly of the lens-system relatively to the axis of the instrument is for bringing the image of the photograph more into general focus on the map when the planes of the photograph and the map are not parallel to each other.

An example of construction will now be described with reference to the accompanying drawing, in which:—

Figure 1 is a side elevation of the whole instrument. Figure 2 is a front view of its photograph-holder.

The instrument comprises photograph-holder A, map-holder B, lens-system C, and base D. For purposes of description it will be assumed that the base D is horizontal, though generally it may be inclined so as to make the map-holder B lie at a slope similar to that of a desk surface. In the example illustrated adjustment of the relative distances of A, B and C is got by the longitudinal movement of A and C; but any of the parts A, B and C may be movable along the base. Further, for altering the attitude angularly relatively of the parts A and B, A is shown movable about a vertical axis and B about a horizontal axis.

The photograph-holder A comprises a board 1 for carrying a paper photograph which may be pinned or otherwise fixed to its surface. The board 1 is movable about a vertical pivot 2 which motion may conveniently be controlled from the map-holder end of the instrument by means of Bowden wires 3 actuated by a lever 4. The photograph is illuminated in the case shown by four electric lamps 5 provided with reflectors.

The map-holder B comprises a frame 6 carrying a plate 7 of glass over which a sheet of translucent material, upon which the map is to be drawn, is placed and, when adjusted, fixed in position. The map-holder turns about a horizontal axis at 8 and is set angularly by screws 9.

The carrier for the lens-system C consists of a standard 10 adjustable transversely in a block 11 which is movable longitudinally on the base D. Standard 10 carries a slide 12 movable vertically which may be controlled by a slow motion arrangement. To slide 12 a carrier 13 is hinged at 14 so as to be capable of movement angularly about the axis of 14 which is horizontal and carries a lens-holder 15 mounted on vertical pivots 16 and is controlled by screws 17. By this arrangement the attitude angularly of the lens-system 18 can be altered relatively to the axis of the instrument so as to produce the best image of the photograph when the photograph surface and the map surface are not parallel to each other. A bellows 19 may connect the map-holder B and the lens-system C so as to exclude extraneous light from the map surface.

In use, a print from an air photograph is pinned or otherwise fixed on the board 1 and strongly illuminated by the lamps 5. A sheet of translucent material, say tracing paper or matt surface drawing celluloid, is placed over the map-holder 6 and, if the distances apart of the photograph-holder A, the lens-system C and the map-holder B and their attitudes are correct, an image of the photograph is formed on the back of the tracing paper. It is convenient to have clearly marked on the photograph three points whose positions on the ground are known and can previously be represented on the desired scale on the map surface. If the map of the three points is larger than the representation of the three points on the photographs, the distance between B and C is increased and the distance between A and C is reduced until approximate agreement in size is obtained, and the map may be oriented and moved about on the map-holder in order to make the image of the three points nearly coincide with the corresponding points on the map. It may be convenient to mount the frame 6 of map-holder B so as to be capable of being turned about the axis of the instrument by a small amount to facilitate the orientation of the map relatively to the image of the photograph. This motion may be controlled by a suitable slow motion mechanism.

If the ground were level and the photograph were taken vertically downwards, co-incidence of the three points would be obtained with the map-holder B and the photograph-holder A parallel to each other. But if there has been any tilt of the camera in taking the photograph, the triangle formed by the three points on the photograph will not be similar in form to the triangle formed on the map by the three points. In that case to get correct fitting of the three points it is necessary to angle the map-holder about the horizontal axis 8 or the photograph-holder about the vertical axis of pivot 2 or to make both of these adjustments.

Further, if the map-holder and the photograph-holder are not parallel to each other, the best definition over the whole of the projected image will be got with the lens 18 set with its axis more or less out of line with the axis of the whole instrument. This adjustment is accomplished as above described by moving the lens about the axes at 14, 16. In the case illustrated the lens 18 can also be moved horizontally and vertically by means of the slide provided to move the image on the map screen by a small amount vertically and horizontally.

When the apparatus has been so adjusted that the image of the photograph coincides with the map at the three control points, the other features of the photograph will fall into their correct positions on the map surface. They can then be sketched in on the front of the map surface with ease and rapidity. If the ground photographed has considerable differences of level, and the photograph is taken at considerable obliquity, the map would of course not be correct in all features, but the apparatus is not intended for use in such cases. One of its most important uses is the sketching in upon an existing map details of the district which have been altered since the map was made. For this purpose the old map may be printed on the map surface to begin with and the new details sketched in by aid of this invention.

Suitable scales may be provided. For example, scales may be formed on the base with indices on the slides on which the photograph-holder and the lens carrier are mounted, and these may be so graduated as to indicate the correct distances of the lens and photograph from the map surface, to make the image of the photograph agree in scale with the map, and to have the image in correct focus, or the adjustment of the relative distances of the photograph, the lens and the map may be made by means of screws or other mechanism and the scales provided in connection with such mechanism. The sliding parts may be connected by a mechanism which keeps the focus correct as the scale is altered as is done in some photographic enlarging apparatus.

The apparatus may be so designed as to be capable of being readily folded up or otherwise made conveniently portable.

I claim:

1. Apparatus of the epidiascope kind comprising a base, assumed to be horizontal, a photograph-holder, a transparent map-holder for carrying a translucent mapping surface, a lens-system mounted on the base, the lens-system being situated between the photograph-holder and the map-holder, and means for illuminating the photograph-holder on the side presented to the map-holder, to produce on the mapping material a positive visible and traceable image of a positive photograph supported by the photograph-holder, the photograph-holder and the lens-system being movable longitudinally on the base, the photograph-holder being movable angularly about a vertical axis and the map-holder being movable angularly about a horizontal transverse axis, and also about a horizontal longitudinal axis, and the lens-system being movable transversely and vertically relative to the base and movable angularly about a horizontal axis and about a vertical axis, for the purposes set forth.

2. Apparatus of the epidiascope kind comprising a base, assumed to be horizontal, a photograph-holder, a transparent map-holder for carrying a translucent mapping surface, a lens-system mounted on the base, the lens-system being situated between the photograph-holder and the map-holder, means for illuminating the photograph-holder on the side presented to the map-holder, to produce on the mapping material a positive visible and traceable image of a positive photograph supported by the photograph-holder, the photograph-holder and the lens-system being movable longitudinally on the base, the photograph-holder being movable angularly about a vertical axis and the map-holder being movable angularly about a horizontal axis and the lens-system being movable transversely and vertically relative to the base and movable angularly about a horizontal axis and about a vertical axis, and mechanism for moving the photograph-holder angularly comprising manual control means at the map-holder end of the base and transmission means extending from the control means to the photograph-holder, for the purposes set forth.

3. Apparatus of the epidiascope kind comprising a photograph-holder, a transparent map-holder for carrying a translucent mapping material, a lens-system, the lens-system being situated between the photograph-holder and the map-holder, means for illuminating the side of the photograph-holder presented to the map holder, to produce on the mapping material a positive visible and traceable image of a positive photograph supported by the photograph-holder, the distances apart of the photograph-holder, the lens-system and the map-holder being adjustable and the attitude angularly of the photograph-holder and the map-holder being alterable, and means for mounting the lens-system for movement angularly about two mutually perpendicular axes and also transversely to its optical axis, the movements being relative to both the photograph-holder and the map-holder, for the purposes set forth.

4. Apparatus of the epidiascope kind comprising a photograph-holder, a transparent map-holder for carrying a translucent mapping material, a lens-system, the lens-system being situated between the photograph-holder and the map-holder, means for illuminating the side of the photograph-holder presented to the map-holder to produce on the mapping material a positive visible and traceable image of a positive photograph supported by the photograph-holder, the distances apart of the photograph-holder, the lens-system and the map-holder being adjustable and the attitude angularly of the photograph-holder and the map-holder being alterable, means for mounting the lens-system for movement angularly about two mutually perpendicular axes and also transversely to its optical axis, the movements being relative to both the photograph-holder and the map-holder, and mechanism for moving the photograph-holder angularly comprising manual control means at the map-holder end of the base and transmission means extending from the control means to the photograph-holder, for the purposes set forth.

ARCHIBALD BARR.